Dec. 2, 1969  H. WÄLISCHMILLER  3,481,493
APPARATUS FOR REMOTELY CONTROLLING MOVING-IN
AND -OUT, RESPECTIVELY OF AN EXTENSION PIECE
Filed Aug. 9, 1967  2 Sheets-Sheet 2
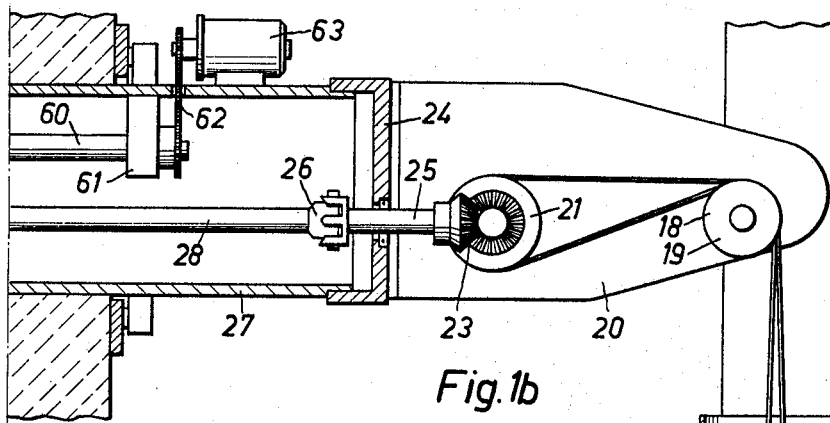
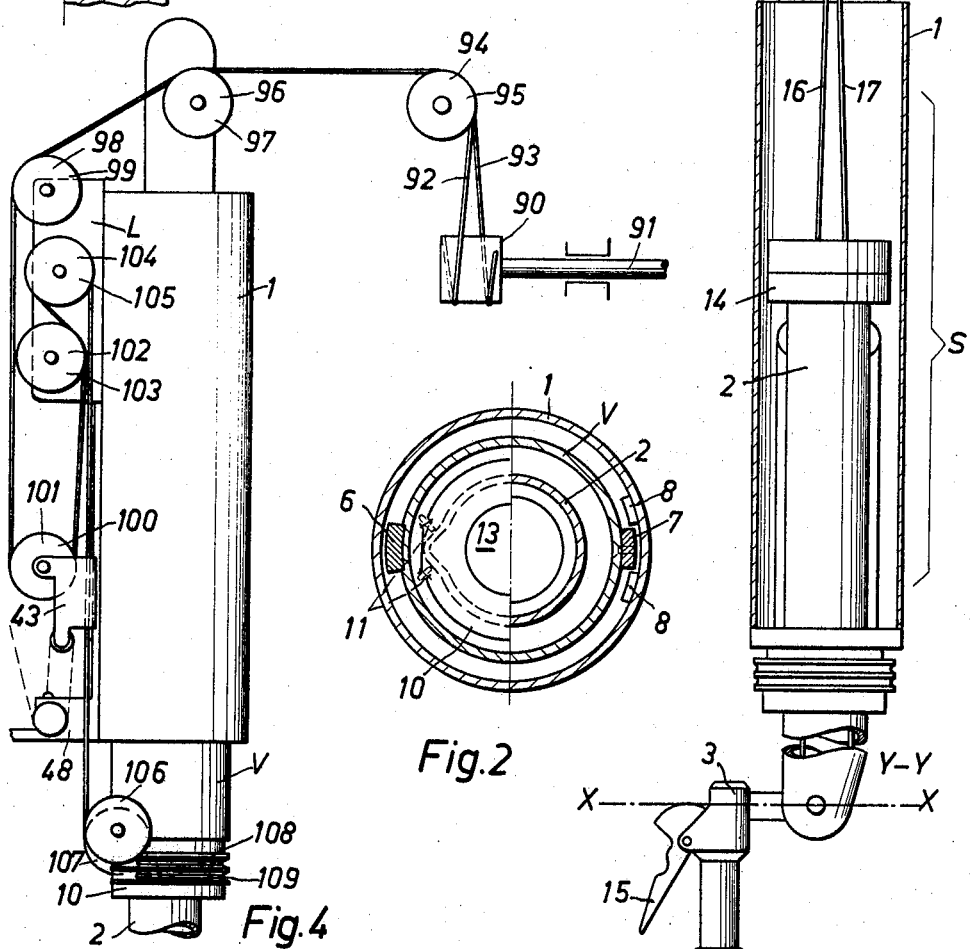
Inventor:

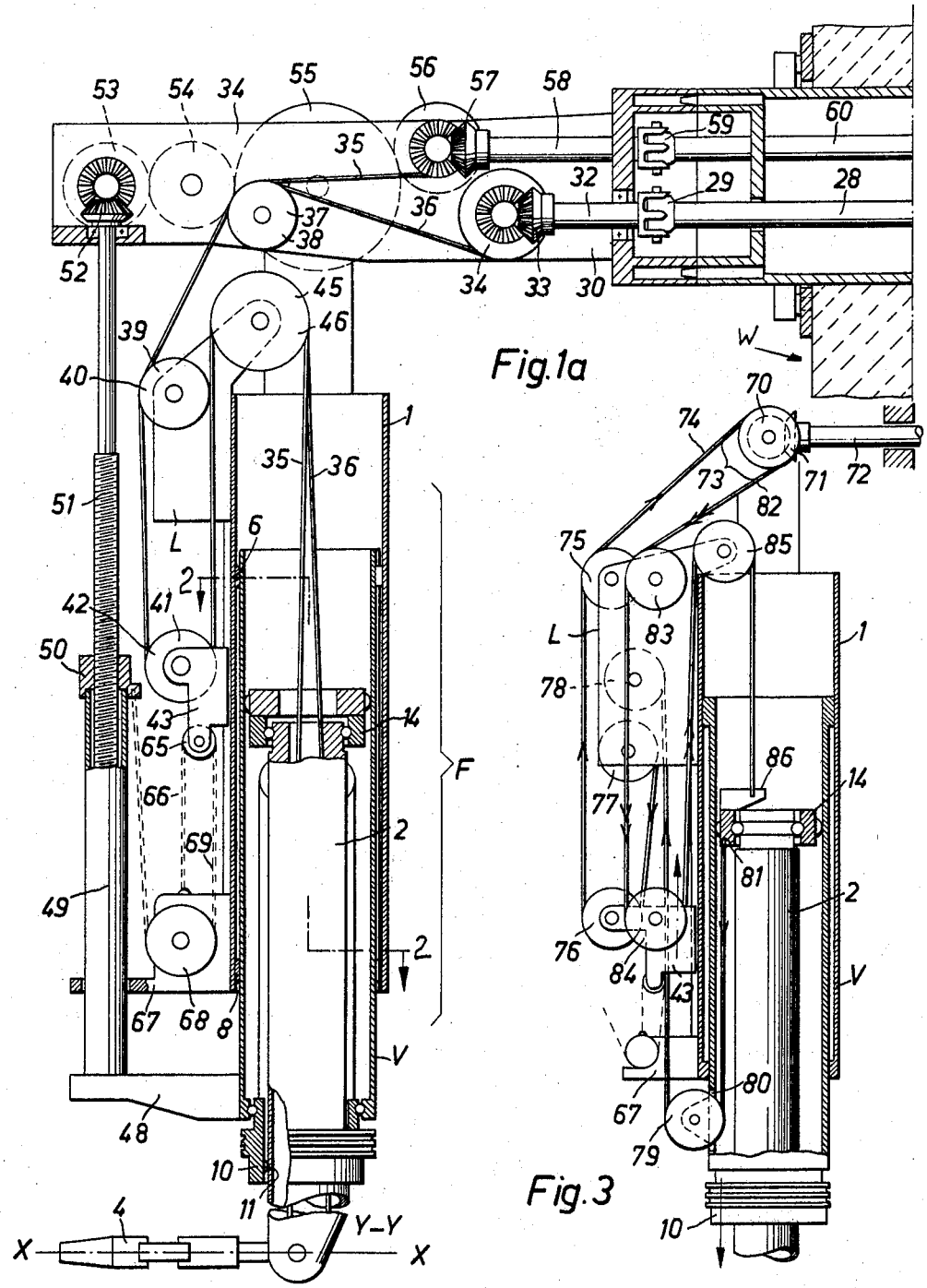

United States Patent Office 3,481,493
Patented Dec. 2, 1969

3,481,493
APPARATUS FOR REMOTELY CONTROLLING MOVING-IN AND -OUT, RESPECTIVELY OF AN EXTENSION PIECE
Hans Wälischmiller, 8 Am Furstenhausle, 7758 Meersburg, Germany
Filed Aug. 9, 1967, Ser. No. 659,391
Int. Cl. B25j 3/00
U.S. Cl. 214—1          7 Claims

ABSTRACT OF THE DISCLOSURE

An apparatus for remotely controlling moving-in and -out, respectively, of an extension piece provided on a follower arm of manipulators for working in non-accessible spaces, which comprises a tubular extension piece, a non-displaceable envelope tube guiding coaxially and non-rotatably the tubular extension piece and, a gripping tool. A rotatable, axially adjustable inner tube carries the gripping tool and is disposed in the envelope tube. A protection wall lead-in is provided and a connecting head is arranged on the protection wall lead-in. An operation gripper is also provided and a plurality of pulling means are operatively connected with the connecting head, and a follower arm includes the envelope tube. Guide rollers are axially displaceable on the envelope tube of the follower arm, and secured to the envelope tube, respectively, and each of the pulling means is guided over the guide rollers for transmission of the functions and movements of the operating gripper. A carrier for the rollers is axially displaceable and means are provided for moving the tubular extension piece, and also means for coupling the carrier for the rollers with the means for moving the tubular extension piece such, that the carrier for the rollers and the extension piece are axially displaced in relative dependency for lengths corresponding with each other but in opposite directions.

---

The present invention relates to an apparatus for remotely controlling moving-in and -out, respectively, of an extension piece, in general, and to such apparatus to be applied to a follower-arm of manipulators for work in non-accessible spaces, whereby in a non-displaceable envelope-tube of the follower arm, the tubular extension piece is coaxially guided and in its inner space a rotatable, axially displaceable inner tube, carrying a gripping tool, is disposed.

Such extension piece has the purpose to make possible additionally the enlargement of the length and, accordingly, the reach of the follower arm such, that it can be adjusted independently from the length of the control arm to the prevailing present tasks, and to the spacial existencies in the endangered space to a great extent, whereby the additional extension is measured such, that the gripping tool can also be guided into such ranges of the space, which are not reachable with the normal swinging radius of the follower arm, since the latter reaches only up to the conventional working height, which corresponds also to the working height on the control arm.

The technical difficulties occurring thereby result in particular from the demand, that the transmission members provided for the usual working height of the gripping member on the follower arm, thus, the pulling ropes and their guide means must follow the mentioned extension, without occurrence of additional forces in the ropes which disturb the working movements.

In known embodiments, this problem is solved such, that for each transmission rope, a length of the rope is provided on the control arm, which is extended and shortened, respectively, for removal and insertion, respectively, of the extension piece by means of a block-like pull arrangement mechanically or manually. These rope length variations are then transmitted in conventional manner to the pulling ropes of the follower arm, so that the ropes cannot perform any movements disturbing the control process during a displacement of the extension piece.

Since the transmission of the rope movements from the control side to the follower side takes place knowingly by means of guide pulleys and other kinematic means in a protecting wall lead-in and the entrance- and exit-positions of the ropes must be, under circumstances, gas- and dust-proof, particular measures and continuous controls are required in case of long rope paths, which are created by the above stated rope paths balance, in order to secure at all times the gas- and dust-proof passage. Also the necessary great rope lengths and rope paths favor the thermally and mechanically conditioned length variations of the pulling members, which lead then to inexact movement-transmissions and operating errors. The mentioned drawbacks are circumvented for this reason many times such, that the use of an extension piece in the follower arm is obviated and the manipulator arms are exchanged for arms having suitable lengths. By such arrangement, however, complicated and time-consuming mounting labor is created, combined with an extensive storage holding of complete manipulator arms of different lengths.

It is, therefore, one object of the present invention to provide an apparatus for remotely controlling moving-in and -out of an extension piece, wherein each pulling member, provided for the transmission of the functions and movements of the operating gripper to the gripping tool, originating from the connecting head of the protecting wall lead-in is guided over a guide roller, each axially displaceable on the envelope tube of the follower arm, and a guide roller, whereby an axially displaceable roller carrier is forcibly coupled with the apparatus for removal and insertion of the extension piece such, that the roller carrier and the extension piece are axially displaceable in relative dependency for lengths corresponding, relative to each other, but extending in opposite directions.

By this arrangement, it is brought about, that a length is prescribed on the envelope tube of the follower arm for each pulling member between the displaceable and the non-movable guide pulley, which makes possible the removal and insertion of the extension piece, without permission that additional forces become effective in the pulling member, which could disturb its functions.

The apparatus for automatic moving-in and -out, respectively, designed in accordance with the present invention, for an automatic balancing of the rope-length variations during displacement of the extension piece is arranged on the follower arm, so that the rope equalization does not take place any more through the protecting wall and the related above-stated drawbacks are removed. This is in particular in appearance, if for the transmission of the working movements from the control arm to the follower arm in the protection wall lead-in rotary shafts are used, since the latter substitute an appreciable part of the rope lengths, so that still a further reduction of the above-mentioned drawbacks in connection with the rope length is obtained.

In this sense, in accordance with the present invention, for the drive transmission for the displacement of the extension piece, an additional rotary shaft, mounted in the wall lead-in tube and under circumstances, gas-proof, is provided, which is connected on the control side to a reversing motor secured to the wall lead-in tube. The mentioned rotary shaft transmission has also the further advantage that the removal of the connecting head between the follower arm and the wall lead-in is retained without additional measures.

It is still another object of the present invention to provide an apparatus for remotely controlled moving-in and -out, respectively, of an extension piece, wherein each pulling member originating from the pulley on the displaceable roller holder and in particular serving the gripper operation and the height adjustment of the inner tube is disposed over a further guide pulley arranged at the upper end of the envelope tube and is guided to the prevailing connecting point and extending into the inside of the tube within about the range of the axis of the tube. By this arrangement, it is brought about that the rotary movements of the inner tube cannot influence the ropes extending within the range of the center axis, so that no transmission disturbances can occur.

With these and other objects in view which will become apparent in the following detailed description, the present invention will be clearly understood in connection with the accompanying drawings, in which:

FIGURES 1a and 1b are a schematic elevation, partly in section, of the manipulator;

FIG. 2 is a section along the lines 2—2 of FIG. 1a;

FIG. 3 is a schematic elevation, partly in section, of the transmission elements for the upward and downward movement of the inner tube; and FIG. 4 is a schematic showing of the transmission elements for the rotary movement of the inner tube.

Referring now to the drawings, the apparatus comprises in connection with the shown manipulator a control arm S, a protecting wall lead-in W, and a follower arm F. The control arm S and the follower arm F comprise each an envelope tube 1 and an inner tube 2 displaceable upwardly and downwardly, at the lower end of which inner tube 2 is disposed on the control side the operating gripper 3 and on the follower side the gripper 4. The follower arm F is additionally equipped with an extension piece V, which is likewise of tubular shape and is guided between the envelope tube 1 and the inner tube 2 concentrically to the latter, displaceable, yet non-rotatable. For this purpose a plurality of guide members 6 is arranged at the upper end of the extension tube V (FIG. 2), which guide pieces 6 serve the purpose of guiding the V tube in the envelope tube 1. Furthermore, an abutment ridge 7 is secured to the extension tube V, which ridge extends from the bottom to the top such, that it is axially displaceable between the lower guide pieces 8, which are secured to the envelope tube 1, whereby a rotation of the extension tube V relative to the envelope tube 1, is avoided. At the lower end of the extension tube V and the control sided envelope tube 1, respectively, a driver ring 10 is rotatably, but non-displaceably provided, on which driver ring 10 anti-friction bodies or rollers 11 provided, which engage the sides of an axially projecting bead 13 (FIG. 2), in known manner, and thereby transmit the rotation of the ring 10 to the inner tube 2 in both directions. At its upper end, the inner tube 2 is rotatably mounted in a head plate 14, which is guided non-rotatably in the extension tube V and axially movable on the control side in the envelope tube 1, respectively.

In the embodiment disclosed in FIGS. 1a and 1b, for the purpose of better demonstration, only the transmission elements for the manual link movements performable on the operating gripper 3 are shown. These consist of the opening and closing movements of the gripper tongue 4 to be performed with a pulling lever 15 and the swinging movements about the axis x—x, as well as about the axis y—y disposed perpendicularly thereto. These movements are transmitted in known manner over forced drive means to the pulling members 16 and 17 which over guide rollers 18 and 19 are guided to the rope pulley 21 mounted on the control sided connecting head 20. From the roller 21 the movements are transmitted over an angular drive 23 to a shaft piece 25 mounted in the closing plate 24, which shaft piece 25 is connected by means of a plug coupling 26 with the shaft arrangement 28 extending in the tube 27 of the wall lead-in W.

On the "hot" side of the protecting wall, the connecting head 30 is removably secured to the lead-in tube 27. This connecting head 30 carries the follower arm F and in a console-like extension 31 the transmission means necessary for the transmission of the control movements. The rotary movements of the shaft 28 are thereby transmitted by means of the plug coupling 29 to a shaft piece 32 mounted in the connecting head 30 and from there over the angular drive 33 to a rope pulley 34, over which a pulling rope is disposed, the lengths 35 and 36 of which are guided by means of rollers 37 and 38 to the connecting head 30 and 31 and thereafter, over further rollers 39 and 40, which are mounted on the bearing block L of the envelope tube 1 and are laid about the guide rollers 41 and 42. The latter are mounted in a roller carrier 43 which is guided for longitudinal displacement of the envelope tube 1. From here, the pulling members 35 and 36 are disposed over further guide rollers 45 and 46 mounted likewise on the bearing block L of the envelope tube 1 and further into the inside of the inner tube 2. Here, the pulling rope movements are transformed over transmission means (not shown) into the functions caused by the operating gripper 3 and 15. As is apparent from the drawing, the pulling members 35 and 36 run from the rollers 45 and 46 into the inside of the tube 2 about within the range of the center axis of this tube.

The inner tube 2 is guided, as is known, upwardly and downwardly on the control- and follower-side. The means applied for these movements and their transmission are not shown in FIG. 1. In addition to these upward and downward movements relative to the extension tube V, the inner tube 2 performs, however, also the moving-out and moving-in of the extension tube V, without changing its level position relative to the extension tube V and whereby this height position can be adjusted from the control arm during each movement phase of the extension tube V. The kinematic means used thereby are disclosed in FIG. 3.

The transmission embodiment disclosed in FIGS. 1a and 1b shows the means, with which the extension tube V can be moved-out and in without influencing thereby the gripper functions. For this purpose, a holder 48 is secured at the lower end of the extension tube V, which holder 48 carries a sleeve 49 which has on its top a threaded nut 50. A spindle 51 is screwable into this nut 50 which can be driven by an angular drive 52 mounted in the connecting head 30 and 31. By means of gears 53, 54, 55 and 56 or other controlled transmission means, a driving connection to the angular drive 57 is arranged, which drive 57 is connected by means of the shaft piece 58 mounted in the connecting head 30 and a plug coupling 59 to the rotary shaft 60. The latter passes through the tube 27, mounted in the bearing 61 and connected with the chain drive 62, which provides the connection to the reversing motor 63. The latter is secured to the tube 27 or to a connecting member combined with the tube 27 and can be put in and out of operation by the operating gripper 3, for instance, by a switch.

The rotary movements, transmitted from the motor 63 to the spindle 51 causes the moving-in and -out, respectively, of the extension tube V by means of the nut 50, the sleeve 49, the holder 48 depending upon the direction of rotation. In order to avoid, thereby, a movement, relative to the inner tube 2, of the rope lengths 35 and 36 entering centrally the tube, the roller carrier 43 is moved upwardly upon outward movement of the extension tube V and moved downwardly upon inward movement of the extension tube V, whereby the movement in upward direction is caused by the pull of the cords 35 and 36. For the movement of the roller carrier 43 in downward direction, thus when the extension tube V is pulled upwardly by means of the nut 50, the roller carrier 43 is equipped with a chain wheel 65 on which the chain 66 is mounted, the one end of which is anchored in a holder 67. The latter is secured to the envelope tube 1 and carries the chain wheel 68, over which the other rope length 69 of the chain is laid. The end of this rope length is secured to the nut 50 and to the sleeve 49, respectively.

This arrangement brings about that upon downward movement of the extension tube V and, thereby, of the nut 50, as well as of the inner tube 2, the roller carrier 43 could be correspondingly pulled upwardly, whereby between the nut 50 and the roller carrier 43 a continuous controlled force connection exists over the paths 65 to 69. In the case of the movement in the other direction, in which thus the rope lengths 35 and 36 are extended by the upward movement of the extension tube V, the upwardly moving nut 50 pulls the roller carrier 43 over the chain 69 correspondingly in downward direction, so that also during this movement phase, the rope lengths 35 and 36 and the connecting parts of the pulling cords remain taut and are thus at any time in a position to transmit exactly the movements arriving from the control arm to the gripper 4.

Since between the rollers 41, 42 and 45, 46 the principle of the "loose roller" is effective, the roller carrier 43 is always moved after only for the half length of the stroke of the extension tube V.

The just described principle for equalization of the rope length variation during moving-in and moving-out of the extension tube V is likewise applicable in the means for transmission of the further control movements of the manipulator. As already mentioned, the transmission elements for the individual movement possibilities are shown in separate figures each in the interest of a better clarification of the disclosure.

FIG. 3 discloses the elements for the upward and downward movement of the inner tube 2, which is longitudinally displaceable in the extension tube V of the follower arm F, however, non-rotatably guided. The rope pulley 70 mounted in the connecting head 30 stands in driving connection with the corresponding kinematic parts of the control arm by means of an angular drive 71 and the rotary shaft 72. The movements deriving therefrom are transmitted over a pulling member, for instance, a steel band or a pulling rope 73 wound about the roller 70. One rope length 74 is guided to a guide roller 76 by means of a roller 75 mounted on the bearing block L of the envelope tube 1, which guide roller 76 is mounted on the displaceable roller carrier 43. From here, the pulling member returns over a roller 77 to a guide roller 78 and is guided on the roller holder 43 to the guide roller 79 and, furthermore, through an opening 80 in the extension tube V to the connecting point 81 on the inner tube 2. The other rope lengths 82 run over the roller 83 to the guide roller 84 on the roller carrier 43 and from here over the guide roller 85 on the envelope tube 1 to the other connecting point 86 on the inner tube 2.

During the rotation of the roller 70 in clockwise direction, the rope length 74 moves in the direction of the arrow with simple arrow point, while the rope length 82 is moved in the direction of the arrow having a double arrow point, so that the inner tube 2 is pulled downwardly. In case of a reversed direction of rotation of the roller 70, all direction arrows of the pulling means are properly reversed, and the inner tube 2 is pulled upwardly. These movements give indications that they can be controlled exactly only then, when the pulling members 74 and 82 remain completely taut from the roller 70 to the connecting points 81 and 86, respectively, and during a movement of the extension tube V do not influence any more the position of the inner tube 2. This condition is complied with, analogous to the process described in connection with FIGS. 1a and 1b, by the application of the movable roller carrier 43 and its driving during moving-in and moving-out of the extension tube V.

If, for instance, the extension tube V is moved downwardly (point-dotted arrow), the roller 79 and thereby the inner tube 2 moves downwardly, without possibility of occurring of a rotary movement of the rope pulley 79 and a relative movement of the inner tube 2 to the extension tube V. This is brought about such, that during this movement the roller carrier 43 is pulled upwardly with the rollers 76 and 84, whereby the pulling rope, disposed over the rollers 85 and 78, can follow the movement of the extension tube V, without causing a movement in the rope lengths 74 and 82 and on the roller 70, respectively.

FIG. 4 shows the transmission elements on the follower arm for the rotary movements of the inner tube 2 abouts its axis. As already mentioned in connection with FIGS. 1a and 1b, these rotary movements are transmitted to a driving ring 10 and from there then over the pressure rollers 11 (FIG. 2) to the inner tube 2. In this case, the rope drum 90 is driven by a rotary shaft 91 originating from the control side. The rotary movements of the drum 90 are transmitted further to the guide rollers 100 and 101 on the displaceable roller carrier 43 by means of pulling members 93 and 93 over rollers 94, 95 and 96, 97, which are mounted in the connecting head and over the rollers 98 and 99 mounted on the bearing block L of the envelope tube 1. From here, the pulling members are guided again upwardly to the rollers 102, 103 and 104, 105 and after reversing again downwardly to the rollers 106, 107. Thereafter, the rope ends enter in clockwise and counter-clockwise run, respectively, in the rope grooves 108 and 109, respectively, where they are secured to the driving ring 10.

Here also, the displaceable roller carrier 43 brings about, that during moving-out and moving-in of the extension tube V, the rope length variation is equalized, so that the transmission elements for the rotary movements of the inner tube are not influenced by the movements of the extension tube V.

Since the description of the moving elements in the control arm is not required for the understanding of the present invention, these elements have been omitted in the drawings for the purpose of better demonstration.

While I have disclosed one embodiment of the present invention, it is to be understood that this embodiment is given by example only and not in a limiting sense, the scope of the invention being determined by the objects and the claims.

I claim:

1. An apparatus for remotely controlling moving-in and -out, respectively, of an extension piece provided on a follower arm of manipulators for working in non-accessible spaces, comprising a tubular extension piece, a non-displaceable envelope tube guiding coaxially and non-rotatably said tubular extension piece, a gripping tool, a rotatable, axially adjustable inner tube carrying said gripping tool and disposed in said envelope tube, a protection wall lead-in, a connecting head in said protection wall lead-in, an operation gripper, a plurality of pulling means operatively connected with said connecting head, a follower arm including said envelope tube, first guide rollers axially displaceable on said envelope tube of said follower arm, second guide rollers secured to said envelope tube, said pulling means being guided over said guide rollers for transmission of the functions and movements of said operating gripper, a carrier for said axially displaceable rollers, means for moving said tubular extension piece, and means for coupling said carrier for said rollers with said means for moving said tubular extension piece such, that said carrier for said rollers and said extension piece are axially displaced in relative dependency for lengths corresponding with each other but in opposite directions.

2. The apparatus, as set forth in claim 1, which includes
rotary shafts operatively connecting and transmitting working movements from said operation gripper to said follower arm,
means for gas-tight sealing said rotary shafts in said protection wall lead-in,
an additional rotary shaft disposed in said protection wall lead-in,
a lead-in tube in said protection wall lead-in, and
a reversing motor secured to said lead-in tube.

3. The apparatus, as set forth in claim 2, which includes
an additional guide roller disposed at the upper end of said envelope tube, and
each of said pulling means originating from said roller on said roller carrier and serving the operation of said gripping tool and the height adjustment of said inner tube is laid over said additional guide roller and is guided to the corresponding connecting point at about the axis of said inner tube into the inner space of the latter.

4. The apparatus, as set forth in claim 2, which includes
a threaded spindle having a nut operatively connected therewith and disposed between said extension piece and said additional shaft, as well as adapted for transmission of the movements originating from said additional shaft for displacement of said extension piece.

5. The apparatus, as set forth in claim 1, which includes
a link chain,
a part of said means for moving said tubular extension piece is coupled with said roller carrier by means of said link chain,
sprocket wheels, and
said link chain is laid on said envelope tube and on said roller carrier by means of said sprocket wheels and secured to said envelope tube.

6. The apparatus, as set forth in claim 1, wherein
an ascending and descending part of said pulling means, running over a roller driven directly from one of said rotary shafts for the upward and downward movement of said inner tube, are guided over a guide roller mounted on said roller carrier, and which includes
an additional roller mounted on said extension piece, and
said descending part of said pulling means is laid over said additional roller and guided to a connecting point on said inner tube through said extension piece.

7. The apparatus, as set forth in claim 1, which includes
a driving ring rotatably and axially immovably mounted at the lower end of said extension piece and concentrically to the axis of said inner tube, and
said driving ring has peripheral grooves to receive pulling ropes and anti-friction rollers on its inner side for the axial movement of said inner tube, and said anti-friction rollers simultaneously transmitting the rotary movements of said driving ring to said inner tube.

References Cited
UNITED STATES PATENTS

| | | | |
|---|---|---|---|
| 3,164,267 | 1/1965 | Jelatis | 214—1 |
| 3,297,172 | 1/1967 | Haaker | 214—1 |

GERALD M. FORLENZA, Primary Examiner

G. F. ABRAHAM, Assistant Examiner